Patented Feb. 28, 1950

2,498,722

UNITED STATES PATENT OFFICE 2,498,722

SOLID DIAZO COMPLEXES

James M. Straley, Easton, Pa., assignor to General Aniline & Film Corporation, New York, N. Y., a corporation of Delaware No Drawing. Application July 4, 1945, Serial No. 603,254

6 Claims. (Cl. 260—67)

This invention relates to solid diazo complexes.

Diazonium compounds are notably difficult to isolate from the diazotization solution and, when separated, are very unstable. Hence, in order to enable the user, whether the use be textile dyeing or diazotype coating, to avoid preparation of the diazo compounds in the dyehouse or coating room, methods have been devised to effect ready precipitation and separation of the diazonium and to impart to it some degree of stability. One of the commonest and oldest methods involves the reaction of diazonium halides with metallic halides to form the double salts of the two reactants. This method of separation and stabilization is useful to both the dyer and the diazotype coater. It is used extensively in the preparation of diazotypes.

Another method involves the preparation of condensation products of diazo salts with primary or secondary amines. This method, however, has been used exclusively by the dyer and has not been found useful in the production of diazotypes since the diazoamino compound is not light sensitive and must be developed by exposure to an acid steam bath.

The metallic halide double salts of diazonium halides which are used extensively in the preparation of diazotypes are not sufficiently stable to withstand the rigors of long storage inherent in this use of diazo compounds. It is with particular reference to the problem of meeting this storage requirement, therefore, that the preparation of the new solid diazo complexes is directed.

Various processes are known for the preparation of light-sensitive layers which depend upon the use of a diazo compound as the light-sensitive medium, and various materials have been employed for the carrier of the light-sensitive layer, including textiles, paper, cellulosic films, glass and metal surfaces. The sensitized carrier is exposed to light under a transparent original which it is desired to reproduce and the diazo compound is decomposed in the areas unprotected by the outline of the original. The undecomposed diazo compound in the protected areas is then used to develop the image of the original by coupling the said diazo compound in an alkaline atmosphere with an azo dyestuff coupling component.

In the two-component layers which contemplate the incorporation of the coupling component into the light-sensitive layer with the diazo compound, the development of the dyestuff forming the image is effected by bringing the exposed light-sensitive layer into contact with gaseous ammonia. This is known as the dry developing process. The dyestuff components, as applied on the carrier are relatively unstable even wher using the metallic halide double salts of the diazo compound and cannot be stored for long periods prior to use. The light-sensitive layers which carry the coupling component as well as the diazo compound in the light-sensitive layer are subject to premature coupling of the said dyestuff components as well as decomposition of the diazo compound upon long storage.

Many attempts have been made to obtain more stable coating solutions and to render the light-sensitive layers produced therefrom less sensitive to deterioration without impairing the light-sensitive qualities of the diazo compound upon which the production of accurate images from the original depends. These attempts have met with various degrees of success.

For the most part stabilization has been sought by the addition, to the coating solution, of materials to retard the decomposition of the diazo and its coupling function. Small amounts of organic acids have generally been used. By limiting the selection of diazo compounds to derivatives of p-diamines and o-amino-naphthols, a certain degree of stability against premature coupling has also been achieved since such diazos do not couple in the absence of the alkaline coupling medium. However, since there is often a sufficient concentration of ammonia and other volatile bases in the atmosphere to neutralize the acids in the coating solution and provide a coupling medium, such measures are not completely effective.

Now I have found that a solid diazo complex can be produced by adding sulfonated resinous compounds to the diazotization solution. The resulting diazo-sulfonated resin complexes are soluble in water and hydrophilic organic solvents and may be used for any azo dye process where separation from the diazotization solution and stability against decomposition of the diazo compound are desirable. The diazo-sulfonated resin complexes are light sensitive and hence are eminently suitable for the preparation of diazotypes.

Light-sensitive two-component layers using these diazo complexes as the light-sensitive medium can be stored for long periods prior to use, and will be stable during storage even under unfavorable conditions.

Various sulfonated resins may be employed as the resin component, such as the formaldehyde condensation product of β-naphthalene sulfonic acid, the polymerized sodium salt of formaldehyde naphthalene sulfonic acid, sulfonated polybenzyl, and the polymerized sulfonates derived from indene, cumarone, benzene, naphthalene, anthracene, diphenyl, toluene, xylene, phenol, cresol, naphthol, anisole, phenetol, resorcinol, hydroxy diphenyl, styrene, etc. While any type of sulfonated resin may be employed, those derived from naphthalene are preferred.

The discovery of these solid complexes is very unexpected, inasmuch as sulfonated resins are commonly used as dispersing agents, and it was not to be expected that they would unite with a diazo to form the novel compounds of the present invention.

The following examples illustrate methods of carrying out the present invention, but it is to be understood that these examples are given by way of illustration and not of limitation.

*Example I*

20 grams of p-diethylaminoaniline hydrochloride are diazotized at 5° C. in the usual manner, and a dispersion of 15 grams of the polymerized sodium salt of formaldehyde naphthalene sulfonic acid in 30 cc. of water are added to the cold diazo solution over a period of 15 minutes. A sticky solid separates at once, and upon filtering and drying, a glassy brown solid is obtained which is soluble in water and hydrophilic organic solvents.

A diazo-type coating of this complex and phloroglucinol upon development gives the usual deep purple prints obtained from the coupling of a diazo salt and phloroglucinol.

*Example II*

20 grams of p-diethylaminoaniline hydrochloride are diazotized below 5° C. in 40 cc. of concentrated hydrochloric acid and 100 cc. of water by careful addition of 7.2 grams of sodium nitrite in 12 cc. of water. After removing the excess nitrous acid with urea a solution of 25 grams of the formaldehyde condensation product of β-naphthalene sulfonic acid in 50 cc. of water is added dropwise with vigorous agitation below 5° C. The sticky solid is filtered off and dried. The yield is 23 grams of a glassy brown solid.

*Example III*

17 grams of 2,5-dichloraniline are diazotized in 15 cc. of concentrated hydrochloric acid and 80 cc. of water at 5° C. with 7.2 grams of sodium nitrite in 15 cc. of water. The excess nitrite is destroyed with urea and a dispersion of 20 grams of the polymerized sodium salt of formaldehyde naphthalene sulfonic acid in 40 cc. of water is added during a period of 15 minutes. The mixture is filtered and the sticky precipitate stirred with 150 cc. of ethanol until finely divided. 10 grams of finely powdered anhydrous sodium sulfate is added and the mixture is filtered with stirring. The precipitate is blended by grinding and allowed to dry. The yield is 26 grams of a light yellow powder, which dissolves readily in water and which gives a clear red dye when coupled with R salt.

Among other properties, the complexes of the present invention have anti-precoupling properties. For example, the following coating solutions (containing phloroglucinol [0.8 gram] as a coupler, thiourea [5.4 grams], the total volume of water being 100 cc. in all cases) were prepared, coated out on paper and stored at 38° C. and 75% relative humidity for 20 hours, then exposed to ultra-violet light under a positive picture, and developed with ammonia vapors. The results are given in the following table:

| | Diazo | Stabilizer | Stability |
|---|---|---|---|
| A | Diazotized p-diethylamino-aniline $ZnCl^4$. | Citric Acid | Poor. |
| B | Diazotized p-diethylamino-aniline—the polymerized sodium salt of formaldehyde naphthylene sulfonic acid. | do | Fair—Good. |

These tests show that the complexes have a stability better than other complexes.

*Example IV*

25 grams of 7-amino-2-hydroxy-4-methyl-quinoline dihydrochloride were diazotized and treated with the polymerized sodium salt of formaldehyde naphthalene sulfonic acid as in Example I.

The sticky solid was blended by grinding with 30 grams anhydrous sodium sulfate. After drying, the mix weighed 54 grams and was a light brown color. A bright orange dye was formed by coupling with 2-naphthol-3, 6, 8-trisulfonic acid.

*Example V*

14 grams of p-nitroaniline were diazotized in 30 cc. of water and 50 cc. of concentrated hydrochloric acid at 0–5° C. with 7.2 grams sodium nitrite. After destroying excess nitrous acid with urea, there was added to the cold solution 20 grams of sulfonated cumarone-indene resin in 50 cc. of water. There was some foaming and a precipitate formed. This was filtered off and blended with 20 grams of anhydrous sodium sulfate, and the yield was 35 grams of reddish-brown powder. The powder coupled with R-salt to a bright red dye.

*Example VI*

12 grams of dianisidine were substituted for the p-nitroaniline in Example V. After complete tetrazotization, 18 grams of a sulfonated polybenzyl resin in 50 cc. of water were added. A dark brown precipitate formed which was treated as in Example V. In this manner there was obtained 31 grams of a brown powder which coupled with phloroglucinol to a reddish-blue dye.

*Example VII*

A 3% solution of the product Example III in water was prepared. Into this solution was immersed a cotton fabric padded with an alkaline 1% solution of Naphthol AS–OL. After 30 minutes of agitation the fabric was removed, rinsed, soaped at a boil, and dried. The cotton was dyed a clear scarlet.

As indicated above, the diazo complexes of the present invention can be used for various purposes, such as a light-sensitive medium in diazo type processes and as an intermediate for the formation of an azo dye in textile dyeing.

I claim:

1. The complex salt of an aromatic light sensitive diazo compound and a sulfonated cumarone-indene resin.

2. The complex salt of an aromatic light sensitive diazo compound and a sulfonated polybenzyl resin.

3. The complex salt of an aromatic light sensitive diazo compound and a polymerized sodium salt of formaldehyde naphthalene sulfonic acid.

4. The complex salt of 2,5-dichlorobenzene diazonium chloride and a polymerized sodium salt of formaldehyde naphthalene sulfonic acid.

5. The complex salt of diazotized 7-amino-2-hydroxy-4-methyl-quinoline dihydrochloride and a polymerized salt of formaldehyde naphthalene sulfonic acid.

6. The complex salt of an aromatic light sensitive diazo compound and a sulfonated resin selected from the class consisting of sulfonated cumarone-indene resin, sulfonated polybenzyl resin, the formaldehyde condensation product of β-naphthalene sulfonic acid and the polymerized sodium salt of formaldehyde naphthalene sulfonic acid.

JAMES M. STRALEY.

REFERENCES CITED

The following references are of record in the file of this patent:

UNITED STATES PATENTS

| Number | Name | Date |
|---|---|---|
| 1,093,567 | Witt | Apr. 14, 1914 |
| 1,500,844 | Plauson | July 8, 1924 |
| 2,063,631 | Schmidt et al. | Dec. 8, 1936 |
| 2,100,063 | Zahn | Nov. 23, 1937 |

FOREIGN PATENTS

| Number | Country | Date |
|---|---|---|
| 4,648 of 1911 | Great Britain | Feb. 26, 1912 |
| 162,738 | Switzerland | July 15, 1933 |

OTHER REFERENCES

Ind. Eng. Chem. (page 17), January 1941.